US012292835B2

(12) United States Patent
Xu

(10) Patent No.: US 12,292,835 B2
(45) Date of Patent: May 6, 2025

(54) PHOTOGRAPHING METHOD AND RELATED APPARATUS

(71) Applicant: HONOR DEVICE CO., LTD., Shenzhen (CN)

(72) Inventor: Jirun Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/570,314

(22) PCT Filed: Jan. 9, 2023

(86) PCT No.: PCT/CN2023/071244
§ 371 (c)(1),
(2) Date: Dec. 14, 2023

(87) PCT Pub. No.: WO2023/160280
PCT Pub. Date: Aug. 31, 2023

(65) Prior Publication Data
US 2024/0273029 A1 Aug. 15, 2024

(30) Foreign Application Priority Data

Feb. 28, 2022 (CN) .......................... 202210193389.0

(51) Int. Cl.
G06F 12/0871 (2016.01)
G06F 12/02 (2006.01)
H04N 23/63 (2023.01)

(52) U.S. Cl.
CPC ...... *G06F 12/0871* (2013.01); *G06F 12/0253* (2013.01); *H04N 23/632* (2023.01);
(Continued)

(58) Field of Classification Search
CPC ............ G06F 12/0871; G06F 12/0253; G06F 2212/302; G06F 2212/455;
(Continued)

(56) References Cited

U.S. PATENT DOCUMENTS 6,389,421 B1 * 5/2002 Hawkins ............... G06F 9/4881
2017/0257561 A1 * 9/2017 Wei ........................ H04N 23/64
(Continued)

FOREIGN PATENT DOCUMENTS

CN 104618640 A 5/2015
CN 105578061 A 5/2016
(Continued)

*Primary Examiner* — Hashem Farrokh
(74) *Attorney, Agent, or Firm* — WOMBLE BOND DICKINSON (US) LLP

(57) ABSTRACT

Embodiments of this application provide a photographing method and related apparatus, which are applied to terminal technologies. The method includes: when the terminal device displays the photo previewing interface, frames are previewed in a cache queue; receiving and responding to the photo-taking operation in the previewing interface, The image from the cache queue is managed in undeletable state; After completing the algorithm processing based on the selected image, the selected image is deleted; The terminal device generates a photo based on the processed image. In this way, the selected image in the cache queue is managed undeletably, so that the selected image is not cleared when the terminal device generates the picture. Then, the cache queue may reserve the selected image for a long time, and the terminal device does not need to copy and store the selected image. Therefore, large memory occupation caused by copy is reduced, and save power.

20 Claims, 9 Drawing Sheets

(52) U.S. Cl.
CPC .. *G06F 2212/302* (2013.01); *G06F 2212/455* (2013.01); *G06F 2212/7205* (2013.01)

(58) Field of Classification Search
CPC ...... G06F 2212/7205; H04M 1/72403; H04M 2250/52; H04N 23/60; H04N 23/80; H04N 23/631; H04N 23/632
USPC .......................................................... 711/113
See application file for complete search history.

(56) References Cited

U.S. PATENT DOCUMENTS

| | | | |
|---|---|---|---|
| 2017/0280064 A1* | 9/2017 | Wei | ........................ H04N 23/70 |
| 2019/0191079 A1 | 6/2019 | Mehta et al. | |
| 2019/0364240 A1 | 11/2019 | Karn et al. | |
| 2020/0221008 A1 | 7/2020 | Gandhi et al. | |

FOREIGN PATENT DOCUMENTS

| | | | |
|---|---|---|---|
| CN | 105827942 | A | 8/2016 |
| CN | 113329176 | A | 8/2021 |
| CN | 113382169 | A | 9/2021 |
| CN | 113810622 | A | 12/2021 |
| JP | 2013243733 | A | 12/2013 |

\* cited by examiner

PHOTOGRAPHING METHOD AND RELATED APPARATUS

CROSS-REFERENCE TO RELATED APPLICATIONS

This application is a national stage of International Application No. PCT/CN2023/071244, filed on Jan. 9, 2023, which claims priority to Chinese Patent Application No. 202210193389.0, filed on Feb. 28, 2022. The disclosures of both of the aforementioned applications are hereby incorporated by reference in their entireties.

TECHNICAL FIELD

This application relates to the field of terminal technologies, and in particular, to a photographing method and a related apparatus.

BACKGROUND

With the development of technology, a terminal device includes increasingly more entertainment functions, where a photographing function is one core of the entertainment functions, and a photographing capability has become an important performance indicator of the terminal device.

Currently, when a user uses the terminal device to perform photographing, processing such as focusing, exposure, and white balancing needs to be performed. As a result, photographing of the terminal device has a certain delay, and a picture obtained through photographing and a preview picture during photographing of the terminal device triggered by the user may be inconsistent, leading to poor user experience.

In a possible design, a zero shutter lag (zero shutter lag, ZSL) photographing function is introduced into the terminal device, to reduce the delay during picture photographing. Specifically, when the terminal device previews a scenario, a plurality of frames of images are cached, and when the user triggers the terminal device to perform photographing, the terminal device may perform processing based on the images cached during previewing to obtain a photographed picture, thereby achieving an effect that the obtained picture is a preview picture.

However, use of the zero shutter lag function may occupy a large memory, leading to great power consumption of the terminal device.

SUMMARY

Embodiments of this application provide a photographing method and a related apparatus, which are applied to a terminal device. By setting a state of a selected image in a cache queue, the terminal device may not clear the selected image when performing algorithm processing on the selected image. In this way, the terminal device reserves the selected image for a long time. Therefore, large memory occupation caused by copy is reduced, and power consumption is reduced.

According to a first aspect, an embodiment of this application provides a photographing method, applied to a terminal device, the method including: caching, by the terminal device when displaying a photographing preview interface, a plurality of frames of preview images in a cache queue; receiving, by the terminal device, a photograph operation in the photographing preview interface; selecting, by the terminal device, an image from the cache queue in response to the photograph operation; controlling, by the terminal device, the selected image to be in an undeletable state in the cache queue; deleting, by the terminal device, the selected image in the cache queue when the terminal device completes algorithm processing based on the selected image; and generating, by the terminal device, a picture based on the image on which the algorithm processing is performed.

In this way, management of an undeletable state is performed on the selected image in the cache queue, so that the selected image is not cleared when the terminal device generates the picture. In this way, the cache queue may reserve the selected image for a long time, and the terminal device does not need to copy the selected image to store the selected image. Therefore, large memory occupation caused by copy is reduced, resources are saved, and power consumption is reduced.

Optionally, the controlling, by the terminal device, the selected image to be in an undeletable state in the cache queue includes: adding, by the terminal device, a label to the selected image, where the label is used for indicating undeletable.

The selected image is controlled to be undeletable through the label, so that a life cycle of each cached image is managed. In this way, a case that the selected image is cleared when existing a camera may be reduced, and a case that the picture cannot be generated is reduced. The label manner is simple to operate and easy to implement.

Optionally, the adding, by the terminal device, a label to the selected image includes: increasing, by a background photographing module in the terminal device, a quantity of invocation times of the selected image by 1.

The selected image is controlled to be undeletable or deletable through the quantity of invocation times, so that a life cycle of each cached image is managed. In this way, a case that the selected image is cleared when existing a camera may be reduced, and a case that the picture cannot be generated is reduced.

Optionally, the selecting, by the terminal device, an image from the cache queue in response to the photograph operation includes: selecting, by the background photographing module in the terminal device after the terminal device receives the photograph operation, a first frame selection policy from a plurality of pre-stored frame selection policies, where the first frame selection policy is used for indicating an image selection manner of the background photographing module, and the first frame selection policy is related to a photographing scenario; and selecting, by the background photographing module, the image from the cache queue based on the first frame selection policy.

In this way, different frame selection policies may be selected based on the photographing scenario to perform image selection. The selected image is more targeted and more flexible, and the generated picture is clearer, thereby improving a picture effect and improving user experience.

Optionally, the frame selection policy includes one or more frame selection parameters, and the frame selection parameter includes but not limited to: a definition, a contrast, a jitter amount, or an exposure time.

In this way, image selection is performed based on a plurality of frame selection parameters, so that the image is selected more comprehensively and accurately, thereby improving a picture generation effect and improving user experience.

Optionally, priority sequences of at least one frame selection parameter in any two frame selection policies are different; or weight values corresponding to at least one frame selection parameter in any two frame selection policies are different.

Optionally, the selecting, by the terminal device, an image from the cache queue in response to the photograph operation includes: selecting, by the terminal device after receiving the photograph operation, a first photograph request from a plurality of pre-stored photograph requests, where the first photograph request is used for indicating a quantity of images selected by the terminal device, and the first photograph request is related to the photographing scenario; and selecting, by the terminal device, the image from the cache queue based on the first photograph request.

In this way, different photograph requests may be determined based on the photographing scenario, and different frames of images may be further selected. For different photographing scenarios, different quantities of images are selected. In this way, the selected image is more targeted, and the generated picture is clearer, thereby improving a picture effect and improving user experience.

Optionally, when the photographing scenario is a high dynamic range imaging scenario, the photograph request is further used for indicating the terminal device to adjust the exposure time.

The photograph request may be further used for indicating the terminal device to adjust a photographing manner.

Optionally, the selected image is a plurality of continuous frames of images in the cache queue, or the selected image is a plurality of non-continuous frames of images in the cache queue.

In this way, the plurality of continuous frames of images may reduce computing and save computing resources; and the plurality of non-continuous frames of images cause the selected image more targeted, thereby better improving a picture effect.

Optionally, the generating, by the terminal device, a picture based on the image on which the algorithm processing is performed includes: performing, by the background photographing module in the terminal device, format conversion on the image on which the algorithm processing is performed, to generate the picture.

In this way, through the format conversion, picture storage by the terminal device is facilitated.

Optionally, the algorithm processing includes but not limited to: noise reduction, linear brightening, tone mapping, gamma correction, or fusion.

Optionally, the method further includes: transmitting, by the cache queue, the selected image to a foreground photographing module in the terminal device; and forming, by the foreground photographing module, a thumbnail based on the selected image, where the thumbnail is displayed in the photographing preview interface of the terminal device after the photograph operation.

In this way, the thumbnail may be displayed in the photographing preview interface, which facilitates the user to view the generated picture.

According to a second aspect, an embodiment of this application provides a terminal device. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

The terminal device includes: a processor and a memory, where the memory stores computer-executable instructions; and the processor executes the computer-executable instructions stored in the memory, to cause the terminal device to perform the method according to the first aspect.

According to a third aspect, an embodiment of this application provides a computer-readable storage medium, and a computer program is stored in the computer-readable storage medium. When the computer program is executed by a processor, the method according to the first aspect is implemented.

According to a fourth aspect, an embodiment of this application provides a computer program product. The computer program product includes a computer program, and when the computer program is run, a computer is caused to perform the method according to the first aspect.

It should be understood that the second aspect to the fourth aspect of this application correspond to the technical solution of the first aspect of this application, and the beneficial effects obtained by each aspect and the corresponding feasible implementations are similar. Details are not described herein again.

DESCRIPTION OF EMBODIMENTS

Figure 1A:
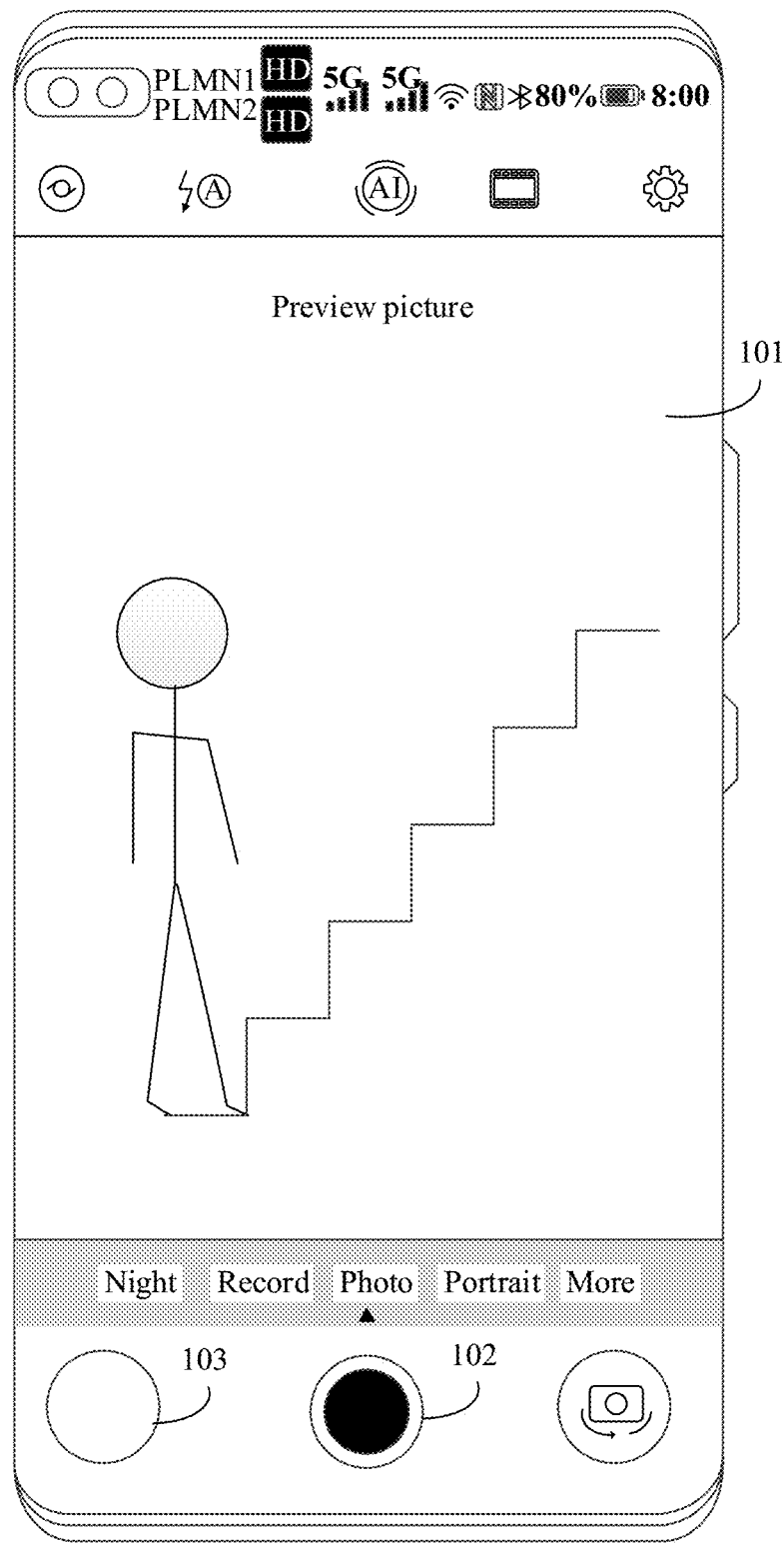
FIG. 1A and FIG. 1B are schematic diagrams of a display interface of a terminal device in a possible implementation.

To clearly describe the technical solutions in the embodiments of this application, in the embodiments of this application, the terms, such as "exemplary" and "for example", are used to represent giving an example, an illustration, or a description. Any embodiment or design solution described as "exemplary" or "for example" in this application should not be construed as more preferred or advantageous than other embodiments or design solutions. Exactly, use of the term such as "exemplary" or "for example" is intended to present a related concept in a specific manner.

In the embodiments of this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof indicates any combination of these items, including a single item or any combination of a plurality of items. For example, at least one item (piece) of a, b, or c may represent a, b, c, a and b, a and c, b and c, or a, b, and c, where a, b, and c may be singular or plural.

The embodiments of this application may be applied to a terminal device with a photographing function. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like. The embodiments of this application may be further applied to a device such as a camera with a photographing function. It may be understood that, the terminal device may be a terminal device with a foldable screen, or may be a terminal device without a foldable screen. The foldable screen may be a foldable screen that can implement 2-folding, 3-folding, or 4-folding. The embodiments of this application impose no limitation on a specific technology and a specific device form used by the terminal device.

The photographing function is an important entertainment function of the terminal device, and a photographing capability has become an important performance indicator for measuring the performance of the terminal device. Currently, when a user uses the terminal device to perform photographing, processing such as focusing, exposure, and white balancing needs to be performed. As a result, photographing of the terminal device has a certain delay, and a photographed image obtained through photographing and a preview picture during photographing of the terminal device triggered by the user may be inconsistent, leading to poor user experience.

Figure 1B:
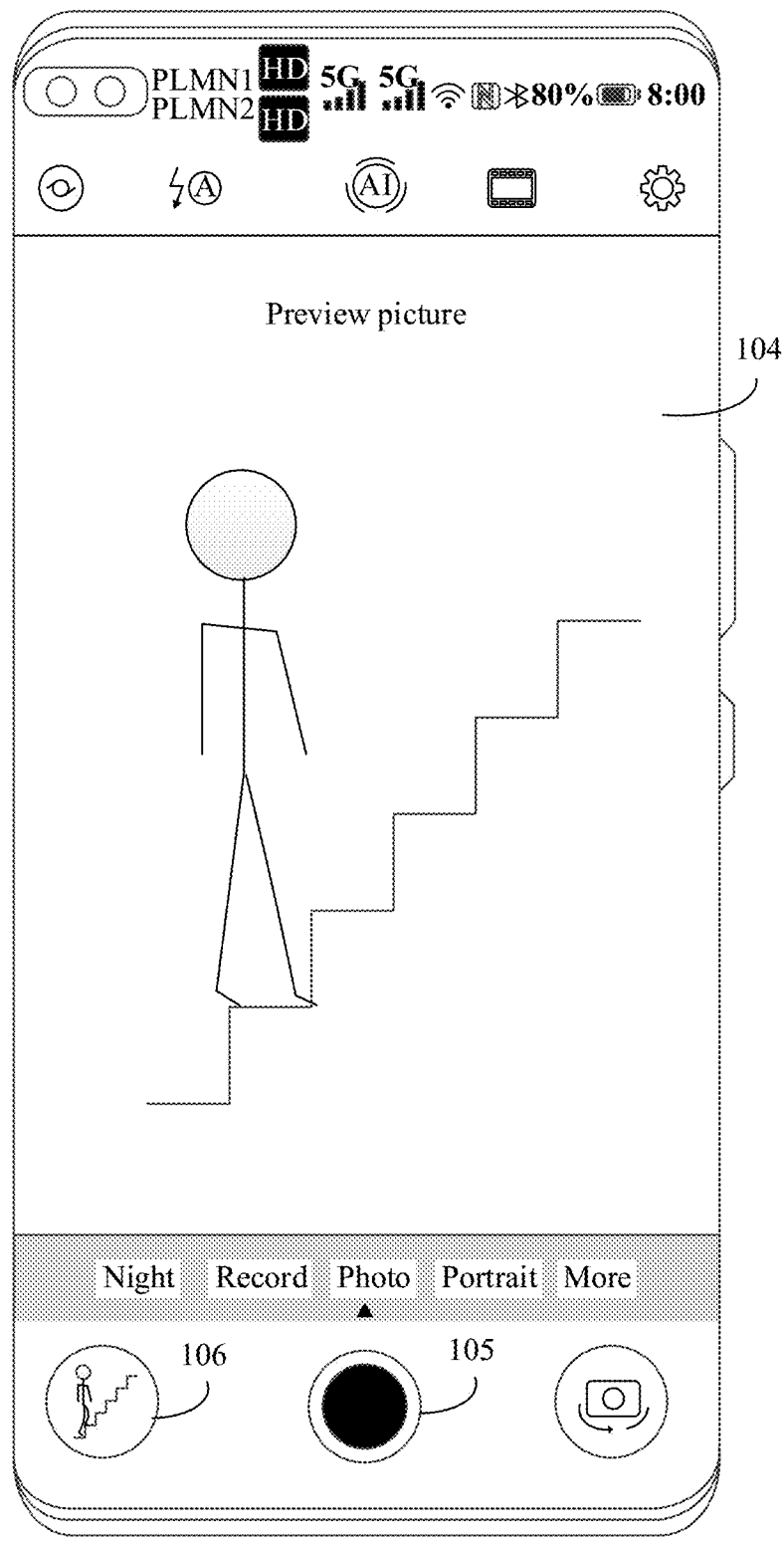

For example, FIG. 1A and FIG. 1B are schematic diagrams of a display interface of a terminal device in a possible implementation. An example in which the terminal device is a mobile phone is used. As shown in FIG. 1A, when a user performs photographing through the mobile phone, the mobile phone may display a photographing interface, and the photographing interface may include a preview box 101 configured to display a preview picture, a photograph control 102 configured to trigger photographing, and a picture thumbnail 103. A preview picture of current photographing may be displayed in the preview box. The preview picture in the preview box 101 is a picture in which a person stands below steps.

When the terminal device receives a trigger operation of the photograph control 102 in the interface shown in FIG. 1A, the terminal device photographs an image and displays the photographed image in an interface shown in FIG. 1B in a form of a thumbnail. The interface includes a preview box 104, a photograph control 105, and a picture thumbnail 106. The thumbnail 106 is a picture in which a person steps on the first step.

It may be seen that, compared with the preview picture in the interface shown in FIG. 1A, the photographed image obtained by the terminal device is inconsistent with the preview picture in the preview box 101, and a certain delay exists.

Figure 2:
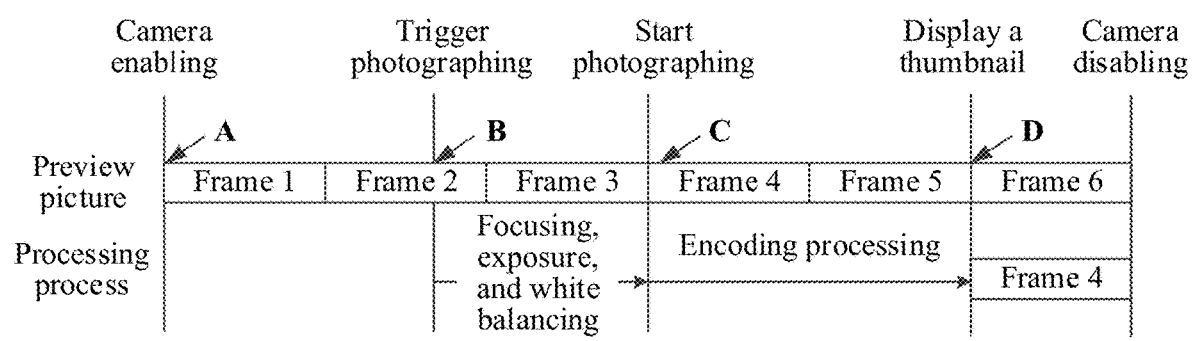
FIG. 2 is a schematic diagram of a picture photographing process of a terminal device in a possible implementation.

FIG. 2 is a schematic diagram of a picture photographing process of a terminal device in a possible implementation. As shown in FIG. 2, the first row indicates preview pictures displayed by the terminal device after a camera is enabled. In chronological order, images corresponding to the preview pictures are respectively a frame 1, a frame 2, a frame 3, a frame 4, a frame 5, and a frame 6. The second row indicates a processing process during photographing of the terminal device.

At a moment A, the camera in the terminal device is enabled, a preview mode is entered, and the terminal device displays a preview picture. In this case, the image corresponding to the preview picture is the frame 1. At a moment B, the terminal device receives an operation that a user triggers a photograph control, and starts to perform a series of processing such as focusing, exposure, and white balancing. In this case, the image corresponding to the preview picture of the terminal device is the frame 2. At a moment C, the series of processing such as focusing, exposure, and white balancing of the terminal device are ended, and the terminal device starts to perform encoding processing on the latest frame of image (the frame 4). The encoding processing may be understood as format conversion processing. For example, a raw format is converted into a jpeg format. In this case, the image corresponding to the preview picture of the terminal device is the frame 4. At a moment D, the encoding processing on the frame 4 is completed, and the terminal device displays the frame 4 in a form of a thumbnail. At a moment E, the terminal device receives an operation used for indicating to exist a camera application, and the camera is disabled.

It may be seen from FIG. 2 that, through the processing such as focusing, exposure, and white balancing of the terminal device, the photographed image (the frame 4) obtained through photographing is inconsistent with the preview picture (the frame 2) when the user triggers the terminal device to perform photographing, and a certain delay exists.

Based on the foregoing implementation, the terminal device introduces a zero shutter lag (zero shutter lag, ZSL) photographing function, to reduce the delay during picture photographing.

Specifically, when the terminal device performs previewing, a plurality of frames of images may be cached. When the user triggers the terminal device to perform photographing, the terminal device may copy and then process some images in the cached images to obtain a photographed picture, thereby achieving an effect that the obtained picture is a preview picture.

For example, the terminal device may cache the image corresponding to the preview picture. The cached image is selected based on a photographing trigger time for encoding processing, and the selected image is displayed on the interface in a form of a thumbnail.

Figure 3:
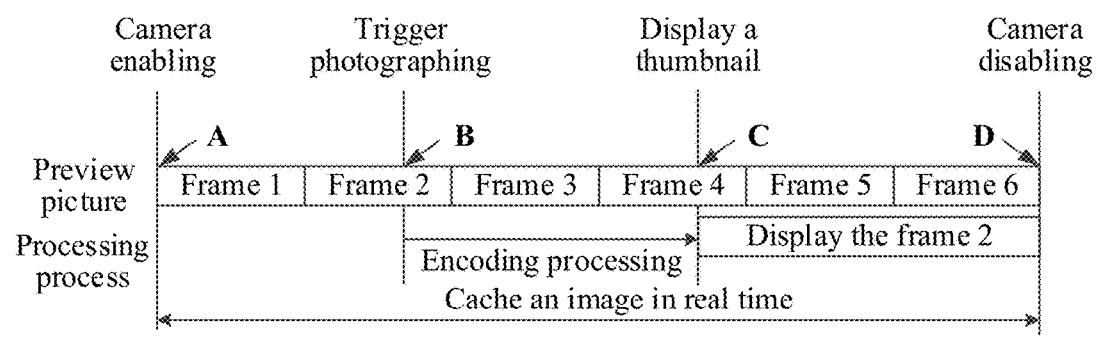
FIG. 3 is a schematic diagram of a picture photographing process of a terminal device in a possible design.

For example, FIG. 3 is a schematic diagram of a picture photographing process of a terminal device in a possible design. As shown in FIG. 3, the first row indicates preview pictures displayed by the terminal device after a camera is enabled. In chronological order, images corresponding to the preview pictures are respectively a frame 1, a frame 2, a frame 3, a frame 4, a frame 5, and a frame 6. The second row indicates a processing process during photographing of the terminal device.

At a moment A, the camera in the terminal device is enabled, a preview mode is entered, and the terminal device displays a preview picture and cache an image corresponding to the preview picture. In this case, the image corresponding to the preview picture is the frame 1. At a moment B, the terminal device receives an operation that a user triggers a photograph control, and selects an image corresponding to a preview picture at the moment B from a cache queue to perform encoding processing. In this case, the image corresponding to the preview picture of the terminal device is the frame 2. At a moment C, the encoding processing of the terminal device is ended, and the terminal device displays the frame 2 in a form of a thumbnail. In this case, the image corresponding to the preview picture of the terminal device is the frame 4. At a moment D, the terminal device receives an operation used for indicating to exist a camera application, and the camera is disabled.

It may be seen from FIG. 3 that, through the zero shutter lag (zero shutter lag, ZSL) function, the photographed image (the frame 2) obtained through photographing is consistent with the preview picture (the frame 2) when the user triggers the terminal device to perform photographing, thereby achieving an effect that the obtained picture is the preview picture and improving user experience.

Figure 4A:
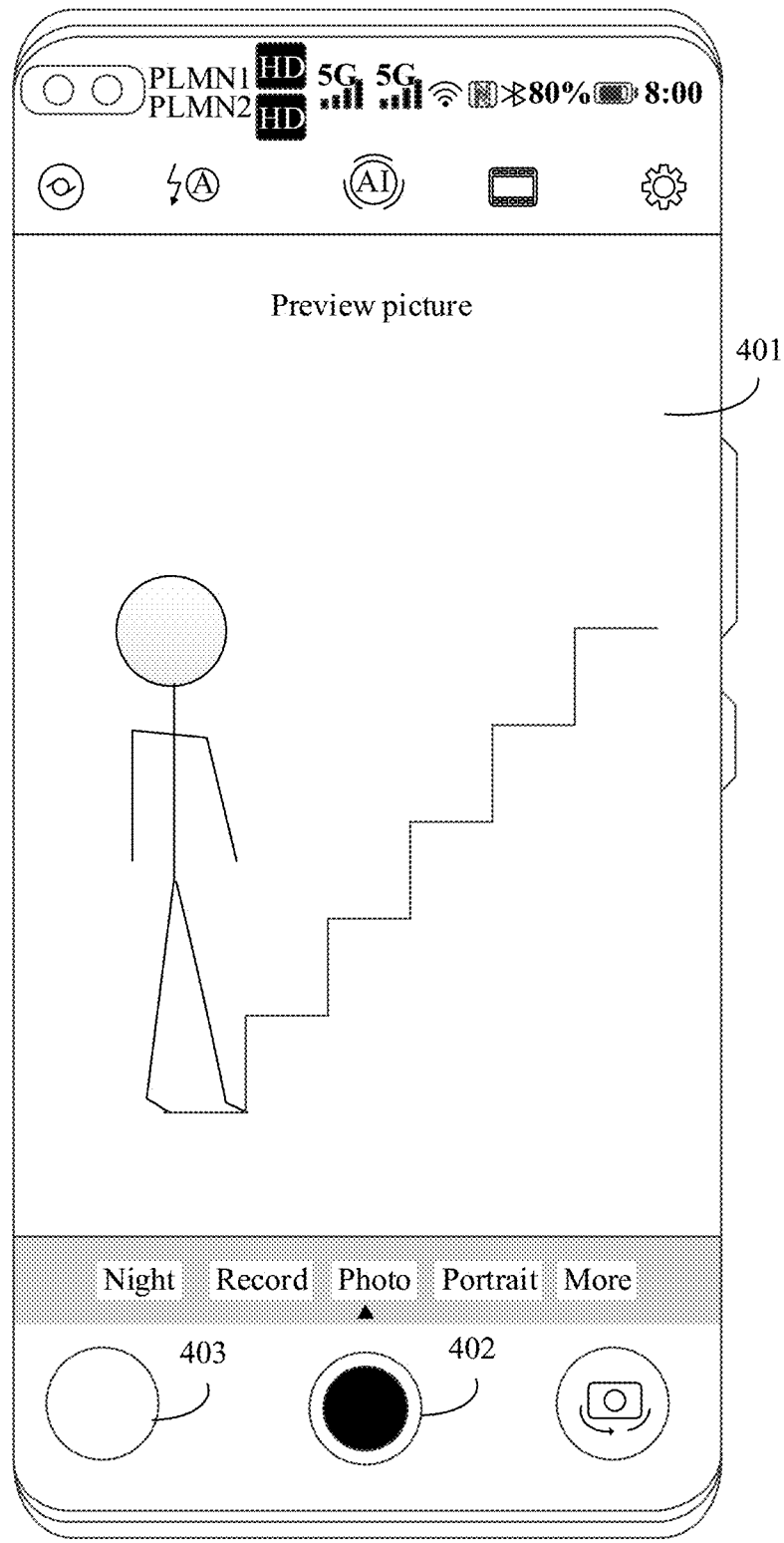
FIG. 4A and FIG. 4B are schematic diagrams of a display interface of a terminal device in a possible design.
Figure 4B:
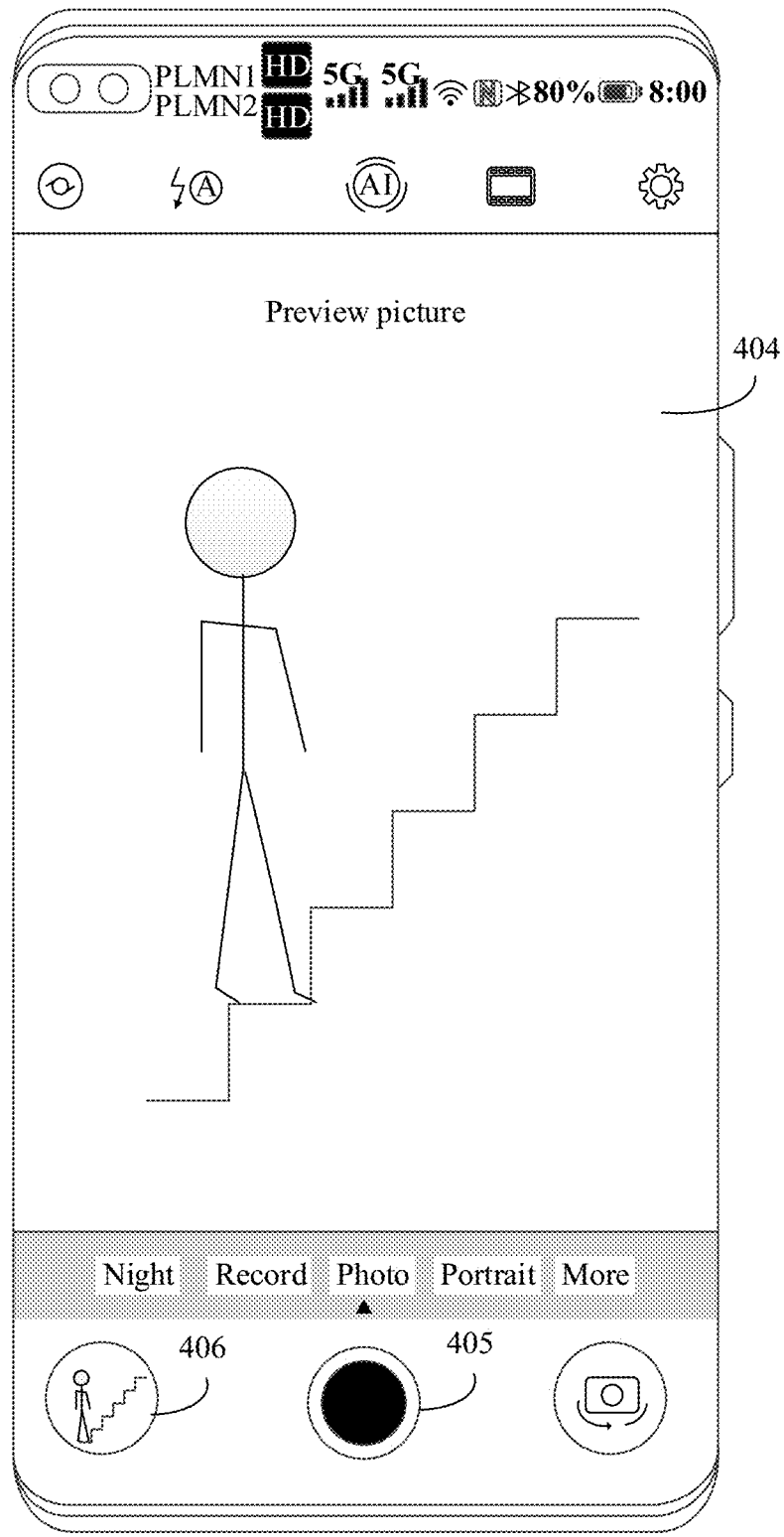

For example, FIG. 4A and FIG. 4B are schematic diagrams of a display interface of a terminal device in a possible design. An example in which the terminal device is a mobile phone is used. As shown in FIG. 4A, when a user performs photographing through the mobile phone, the mobile phone may display a photographing interface, and the photographing interface may include a preview box 401 configured to display a preview picture, a photograph control 402 configured to trigger photographing, and a thumbnail 403 of a photographed image. A preview picture of current photographing may be displayed in the preview box. The preview picture in the preview box 401 is a picture in which a person stands below steps.

When the terminal device receives a trigger operation of the photograph control 402 in the interface shown in FIG. 4A, the terminal device photographs an image and displays the photographed image in an interface shown in FIG. 4B in a form of a thumbnail. The interface includes a preview box 404, a photograph control 405, and a picture thumbnail 406. The thumbnail 406 is a picture in which a person steps on the first step.

It may be seen that, compared with the preview picture in the interface shown in FIG. 4A, the photographed image obtained by the terminal device is consistent with the preview picture in the preview box 401.

Figure 5:
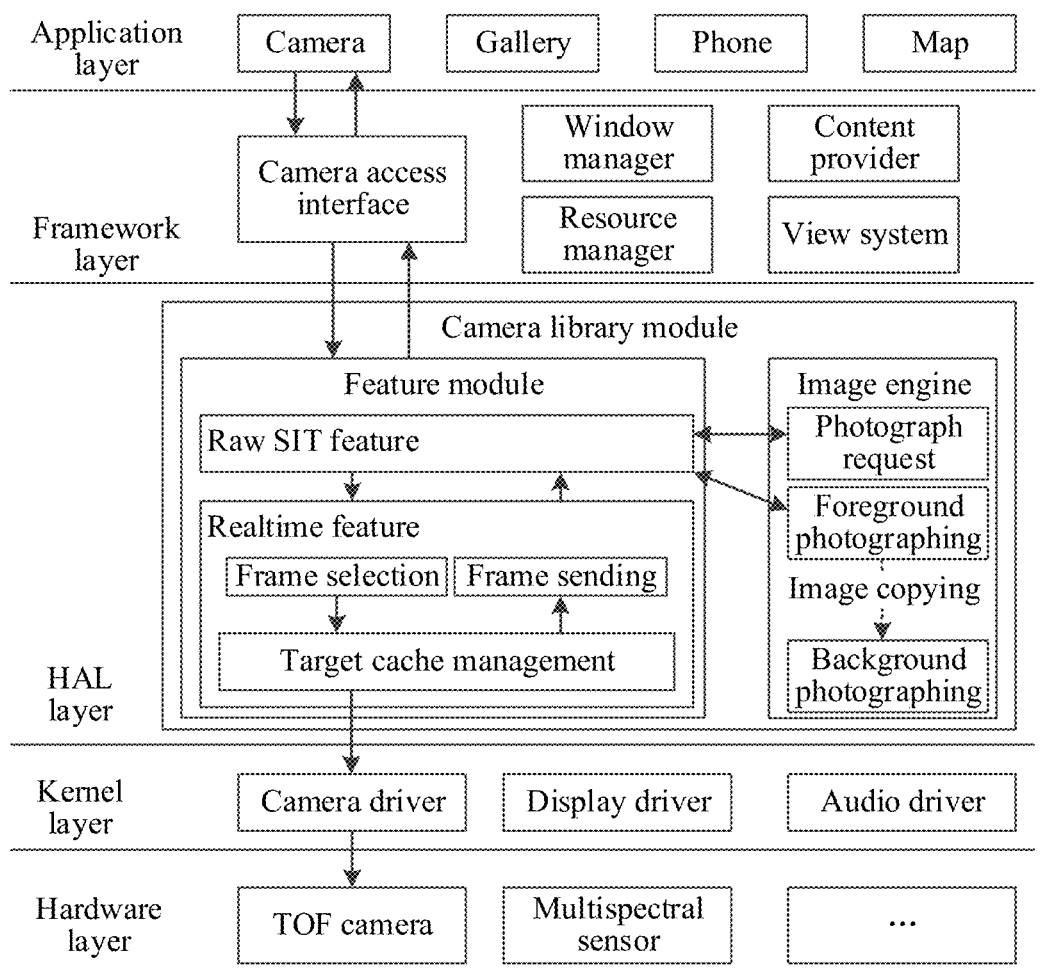
FIG. 5 is a schematic diagram of an internal implementation process of a terminal device in a possible design.

For example, FIG. 5 is a schematic diagram of an internal implementation process of a terminal device in a possible design. As shown in FIG. 5, the terminal device may be divided into five layers, which are respectively an application program layer, an application program framework (framework) layer, a hardware abstraction layer (hardware abstraction layer, HAL), a kernel (kernel) layer, and a hardware (hardware) layer from top to bottom.

The application program layer may include a series of application program packages. As shown in FIG. 5, the application program packages may include application programs such as Camera, Gallery, Phone, Map, and the like.

The application program framework layer provides an application programming interface (application programming interface, API) and a programming framework for application programs at the application program layer. The application program framework layer includes some predefined functions.

As shown in FIG. 5, the application program framework layer may include a window manager, a content provider, a resource manager, a view system, a camera access interface, and the like.

The window manager is configured to manage a window program. The window manager may obtain a size of a display screen, determine whether there is a status bar, lock the screen, touch the screen, drag the screen, take a screenshot, and the like.

The content provider is configured to store and obtain data, and enable the data to be accessed by an application program. The data may include a video, an image, audio, calls that are made and answered, a browse history, a bookmark, an address book, and the like.

The view system includes visual controls, for example, a control for displaying text and a control for displaying a picture. The view system may be configured to create an application program. A display interface may include one or more views. For example, a display interface including a short message notification icon may include a view for displaying text and a view for displaying a picture.

The resource manager provides various resources for an application program, for example, a localized string, an icon, a picture, a layout file, a video file, and the like.

The camera access interface enables an application program to perform camera management and access a camera device. For example, an application program is enabled to manage a camera to perform image photographing.

The hardware abstraction layer may include a plurality of library modules. The library modules may be a camera library module and the like. The Android system may load a corresponding library module for device hardware, thereby realizing a purpose of accessing the device hardware by the application program framework layer. In this embodiment of this application, the camera library module includes an image engine (super image turbo, SIT) and a feature module (feature graph).

The image engine includes a photograph request module, a foreground photographing module, and a background photographing module.

The foreground photographing module corresponds to an image displayed on an interface of a camera application, and may convert the image into a thumbnail and send the thumbnail to the camera application for display.

The photograph request module stores one or more photograph requests. The photograph request may be used for adjusting a photographing manner (for example, an exposure time) of a camera and/or adjusting a quantity of selected images during subsequent image processing.

It may be understood that, specific content included in the photograph request is related to a recognized photographing scenario during camera photographing. For example, when the terminal device detects that the photographing scenario is a low brightness scenario, the photograph request is used for indicating to select four frames of images to perform algorithm processing. When the terminal device detects that the photographing scenario is a high brightness scenario, the photograph request is used for indicating to select one frame of image to perform algorithm processing.

When the terminal device detects that the photographing scenario is a high dynamic range (high dynamic range, HDR) imaging scenario, the photograph request is used for indicating to adjust the exposure time of the camera and indicating to select four frames of images to perform algorithm processing.

The background photographing module corresponds to a picture stored by the terminal device. The background photographing module may perform algorithm processing such as noise reduction and fusion and processing such as format conversion on one or more selected frames of images to obtain a picture; and transmit the picture to a Gallery application to store the picture.

The feature module includes a raw SIT feature (raw SIT feature) module and a realtime feature (realtime feature) module. The raw SIT feature module may obtain the photograph request, and invoke the realtime feature module to select an image and transmit the selected image to the foreground photographing module for processing.

The realtime feature module may select different quantities of images based on the photograph request, and transmit the selected images to the foreground photographing module through the raw SIT feature module for processing.

The realtime feature module includes a frame selection module, a target cache processing module, and a frame sending module. The frame selection module may select an image from the target cache processing module based on the photograph request. The target cache processing module includes a cache queue, and is configured to store an image transmitted by an underlying hardware camera. The frame sending module is configured to transmit the selected image to the raw SIT feature module to perform subsequent image processing.

The kernel layer is a layer between hardware and software. The kernel layer is used to drive hardware, so that the hardware operates. The kernel layer may include a camera driver, a display driver, an audio driver, and the like. This is not limited in this embodiment of this application. The hardware layer may include various types of sensors. For example, sensors of a photographing type include a TOF camera, a multispectral sensor, and the like.

A photographing process in a possible implementation is described below with reference to FIG. 5.

For example, when the terminal device enables the camera application, the camera application sends a command used for indicating preview to the feature module of the hardware abstraction layer through the camera access interface in the application program framework layer. The raw SIT feature module in the feature module invokes the frame selection module in the realtime feature module, to select an image from the cache queue of the target cache management module; and transmits the selected image to the camera application through the frame sending module, the raw SIT feature module, and the camera access interface for preview display.

When the terminal device receives an action used for indicating photographing, the camera application sends a command used for indicating photographing to the feature module of the hardware abstraction layer through the camera access interface in the application program framework layer. The raw SIT feature module in the feature module obtains a photograph request from the image engine (SIT) and sends the photograph request to the frame selection module in the realtime feature module. The photograph request includes a quantity of selected images. The frame selection module selects one or more frames of images from the cache queue of the target cache management module based on the photograph request. The frame selection module transmits the selected image to the foreground photographing module through the raw SIT feature module in the feature module, and the foreground photographing module converts the selected image into a thumbnail and transmits the thumbnail to the camera application through the camera access interface for display.

The foreground photographing module in the image engine may further copy the image selected by the frame selection module, and transmit the copied image to the background photographing module for image processing such as noise reduction, fusion, and format conversion, to generate a picture. The background photographing module transmit the picture to the Gallery application through the application framework layer to store the picture.

In this way, when the terminal device exits the camera application, processing such as noise reduction, fusion, and format conversion may be continuously performed on the copied image, to generate the picture. Otherwise, if the foreground photographing module does not copy the selected image, when the terminal device exits the camera application, processing such as noise reduction, fusion, and format conversion cannot be performed, and the picture cannot be generated.

However, in this manner, the terminal device needs to copy the selected image, leading to large memory occupation and high power consumption. For example, if the terminal device selects four frames of images for processing such as noise reduction, the foreground photographing module needs to store and copy the four frames of images and transmit the copied images to the background photographing module. As a result, memory for eight frames of images may be occupied, leading to large memory occupation.

In view of this, the photographing method and related apparatus provided in the embodiments of this application manage an undeletable state of the image selected from the cache queue, so that the terminal device does not clear the selected image when generating the picture. In this way, the cache queue may reserve the selected image for a long time, and the terminal device does not need to copy the selected image to store the selected image. Therefore, large memory occupation caused by copy is reduced, and power consumption is reduced.

For example, the frame selection module may be placed in the background photographing module, so that the background photographing module may invoke the image in the cache queue. In this way, a copy process of the selected image may be reduced, memory occupation may be reduced, and power consumption of the terminal device may be reduced. In addition, an invocation count management module is further added, so that a case that a cache is cleared caused by disabling of the camera application when the picture is not stored may be reduced, thereby managing a life cycle of each image cached in the cache queue.

Figure 6:
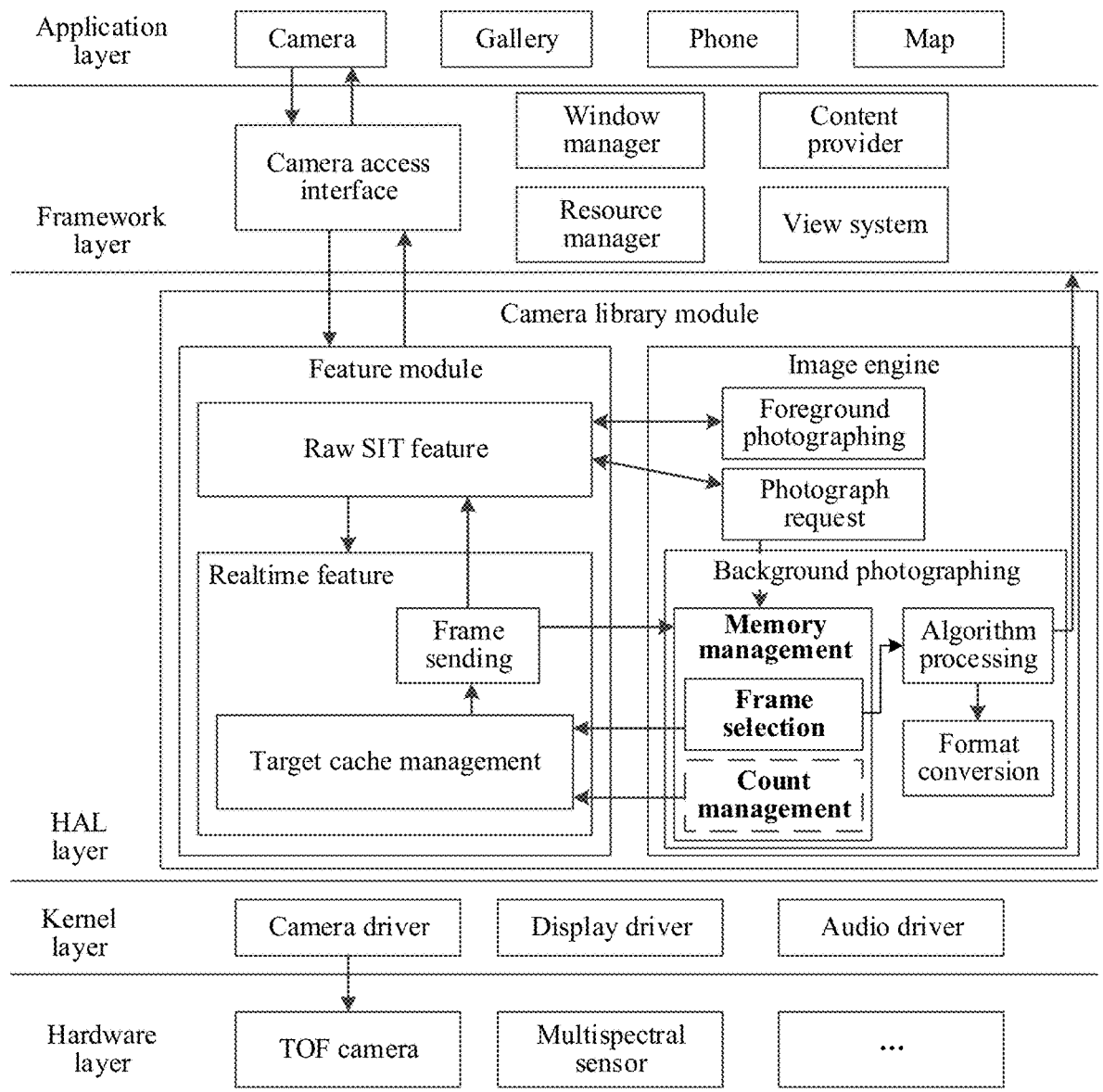
FIG. 6 is a schematic diagram of a software architecture of a terminal device according to an embodiment of this application.

For example, FIG. 6 is a schematic diagram of a software architecture of a terminal device according to an embodiment of this application. As shown in FIG. 6, the terminal device may be divided into five layers, which are respectively an application program layer, an application program framework (framework) layer, a hardware abstraction layer (hardware abstraction layer, HAL), a kernel (kernel) layer, and a hardware (hardware) layer from top to bottom.

The application program layer may include a series of application program packages. As shown in FIG. 6, the application program packages may include application programs such as Camera, Gallery, Phone, Map, and the like.

The application program framework layer provides an application programming interface (application programming interface, API) and a programming framework for application programs at the application program layer. The application program framework layer includes some predefined functions.

As shown in FIG. 6, the application program framework layer may include a window manager, a content provider, a resource manager, a view system, a camera access interface, and the like.

The window manager is configured to manage a window program. The window manager may obtain a size of a display screen, determine whether there is a status bar, lock the screen, touch the screen, drag the screen, take a screenshot, and the like.

The content provider is configured to store and obtain data, and enable the data to be accessed by an application program. The data may include a video, an image, audio, calls that are made and answered, a browse history, a bookmark, an address book, and the like.

The view system includes visual controls, for example, a control for displaying text and a control for displaying a picture. The view system may be configured to create an application program. A display interface may include one or more views. For example, a display interface including a short message notification icon may include a view for displaying text and a view for displaying a picture.

The resource manager provides various resources for an application program, for example, a localized string, an icon, a picture, a layout file, a video file, and the like.

The camera access interface enables an application program to perform camera management and access a camera device. For example, an application program is enabled to manage a camera to perform image photographing.

The hardware abstraction layer may include a plurality of library modules. The library modules may be a camera library module and the like. The Android system may load a corresponding library module for device hardware, thereby realizing a purpose of accessing the device hardware by the application program framework layer. In this embodiment of this application, the camera library module includes an image engine (SIT) and a feature module (feature graph).

The image engine includes a photograph request module, a foreground photographing module, and a background photographing module.

The foreground photographing module corresponds to an image displayed on an interface of a camera application, and may convert the image into a thumbnail and send the thumbnail to the camera application for display.

The photograph request module stores one or more photograph requests. The photograph request may be used for adjusting a photographing manner (for example, an exposure time) of a camera and/or adjusting a quantity of selected images during subsequent image processing.

It may be understood that, specific content included in the photograph request is related to a recognized photographing scenario during camera photographing. For example, when the terminal device detects that the photographing scenario is a low brightness scenario, the photograph request is used for indicating to select four frames of images to perform algorithm processing. When the terminal device detects that the photographing scenario is a high brightness scenario, the photograph request is used for indicating to select one frame of image to perform algorithm processing.

When the terminal device detects that the photographing scenario is a high dynamic range (high dynamic range, HDR) imaging scenario, the photograph request is used for indicating to adjust the exposure time of the camera and indicating to select four frames of images to perform algorithm processing.

The background photographing module corresponds to a picture stored by the terminal device. The background photographing module may perform processing such as noise reduction, fusion, and format conversion on one or more selected frames of images to obtain a picture; and transmit the picture to a Gallery application to store the picture.

In this embodiment of this application, the background photographing module includes a memory management (holder) module, an algorithm processing module, and a format conversion module. The holder module is configured to select an image based on the photograph request, and perform count management on the target cache management module when the background photographing module performs image processing. The algorithm processing module is configured to perform processing such as noise reduction and fusion on the selected image. The format conversion module is configured to perform format conversion on the processed image, to convert the image into a picture, so as to facilitate storage by the terminal device. The format conversion module transmits the converted picture to the Gallery application through the application program framework layer to store the picture.

The feature module includes a raw SIT feature module and a realtime feature (realtime feature) module. The raw SIT feature module may obtain the photograph request, and invoke the realtime feature module to select an image and transmit the selected image to the foreground photographing module for processing.

The realtime feature module may transmit the image selected based on the photograph request to the foreground photographing module through the raw SIT feature module for processing.

The realtime feature module includes a target cache processing module and a frame sending module. The target cache processing module includes a cache queue, and is configured to store an image transmitted by an underlying hardware camera. The frame sending module is configured to transmit the selected image to the raw SIT feature module to perform subsequent image processing.

The kernel layer is a layer between hardware and software. The kernel layer is used to drive hardware, so that the hardware operates. The kernel layer may include a camera driver, a display driver, an audio driver, and the like. This is not limited in this embodiment of this application. The hardware layer may include various types of sensors. For example, sensors of a photographing type include a TOF camera, a multispectral sensor, and the like.

The following describes a photographing process of the terminal device in this embodiment of this application with reference to FIG. 6.

For example, when the terminal device enables the camera application, the camera application sends a command used for indicating preview to the feature module of the hardware abstraction layer through the camera access interface in the application program framework layer. The raw SIT feature module in the feature module invokes the realtime feature module, to transmit the image stored in the cache queue of the target cache management module in the realtime feature module to the camera application through the frame sending module, the raw SIT feature module, and the camera access interface for preview display.

When the terminal device receives an action used for indicating photographing, the camera application sends a command used for indicating photographing to the feature module of the hardware abstraction layer through the camera access interface in the application program framework layer.

The raw SIT feature module in the feature module obtains a photograph request from the image engine (SIT) and sends the photograph request to the holder module in the background photographing module. The frame selection module in the holder module selects one or more frames of images from the cache queue of the target cache management module based on the photograph request. The frame selection module in the holder module transmits the selected image to the algorithm processing module for processing such as noise reduction and fusion, and the algorithm processing module performs format conversion on the processed image to obtain a picture and uploads the picture to the Gallery application to store the picture. In addition, the target cache management module further transmits the selected image to the foreground photographing module through the frame sending module and the raw SIT feature module in the feature module to process the selected image into a thumbnail. The foreground photographing module transmits the thumbnail to the camera application through the raw SIT feature module and the camera access interface for display.

In a possible implementation, a count management module in the holder module may manage a quantity of invocation times of the target cache management module. Specifically, after the photograph request is received, the quantity of invocation times is increased by 1. In this way, when the camera application is disabled, if the picture is not stored, and the quantity of invocation times in the count management module is not zero, a cache in the cache queue is not cleared, and the background photographing module may further continue to process the image cached in the target cache management module and generate a picture.

Figure 7:
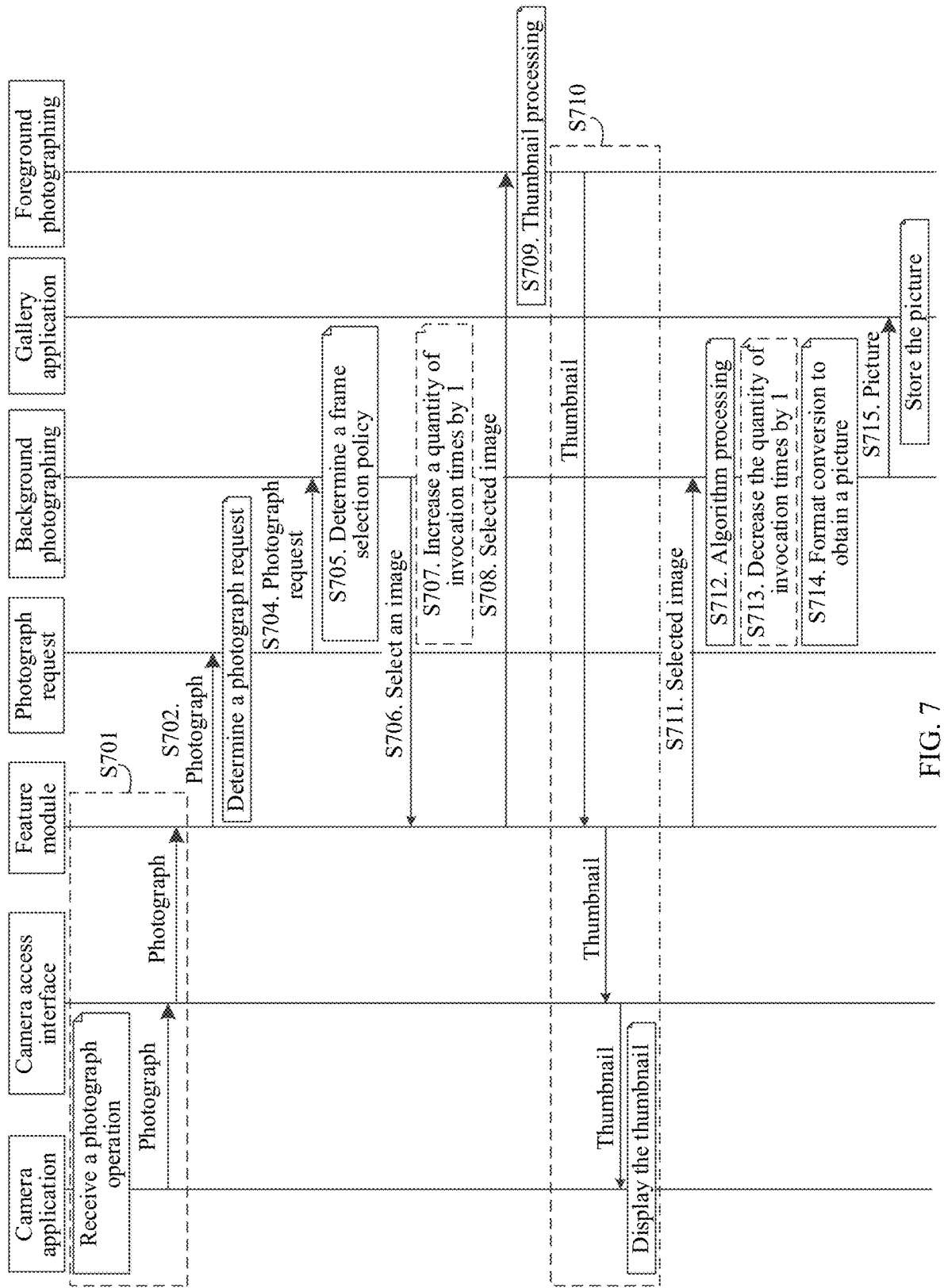
FIG. 7 is a schematic flowchart of module interaction involved in a photographing method according to an embodiment of this application.

For example, FIG. 7 is a schematic flowchart of module interaction involved in a photographing method according to an embodiment of this application. As shown in FIG. 7.

After a terminal device enables a camera application, a camera preview scenario is entered. After the terminal device enables the camera application, the camera application issues a command used for indicating preview to a feature module through a camera access interface. After receiving the command used for indicating preview, the feature module enables a camera through a camera driver to adjust an interval at which an underlying hardware camera obtains an image. For example, the underlying hardware camera is adjusted to obtain 30 frames of images per second. The feature module stores images transmitted by the underlying hardware camera through the camera driver into a cache queue.

S701. When the terminal device receives a photograph operation in the preview scenario, the camera application issues the command used for indicating photographing to the feature module through the camera access interface.

In this embodiment of this application, the command used for indicating photographing includes a moment at which the terminal device receives the photograph operation.

In a possible implementation, the command used for indicating photographing may be a photographing event. The camera application issues the photographing event to the feature module through the camera access interface. The photographing event includes the moment at which the terminal device receives the photograph operation and jpeg memory. The jpeg memory is used for indicating to store a picture.

For example, the photograph operation may be an operation that a user triggers a photograph control on a display interface of the camera application in a touch or tap manner; the photograph operation may alternatively be a photographing quick operation, for example, the quick operation may be double-tapping a power key or a special gesture of the user; and the photograph operation may alternatively be a received voice instruction used for indicating photographing. The photograph operation is not specifically limited in this embodiment of this application.

S702. The feature module transmits the command used for indicating photographing to a photograph request module.

S703. The photograph request module determines a photograph request after receiving the command used for indicating photographing.

In this embodiment of this application, the photograph request is used for indicating a quantity of selected images. For example, the photograph request may be selecting four frames of images.

In a possible implementation, the photograph request may alternatively be used for indicating to adjust a photographing parameter, for example, an exposure time of the underlying hardware camera. Specific content in the photograph request is not limited in this embodiment of this application.

In a possible implementation, the photograph request corresponds to a photographing scenario recognized by the terminal device. Specifically, after receiving the command used for indicating photographing, the photograph request module determines a photographing scenario corresponding to the received photograph operation, and the photograph request module determines the photograph request based on the photographing scenario.

In this embodiment of this application, the photographing scenario may be understood as a surrounding environment and a photographing manner of the user during photographing. In different photographing scenarios, brightness of the surrounding environment and the photographing manner (for example, an exposure time of a camera) during photographing may be different.

For example, the photographing scenario includes but not limited to a high brightness scenario, a low brightness scenario, a backlight scenario, and a high dynamic range (high dynamic range, HDR) imaging scenario. The low brightness scenario may be understood as a scenario in which environmental brightness is relatively low during photographing. The high brightness scenario may be understood as a scenario in which environmental brightness is relatively high during photographing. The backlight scenario may be understood as a backlight photographing scenario. The foregoing photographing scenarios are merely embodiments, and specific photographing scenario division is not specifically limited in this embodiment of this application.

In a possible implementation, the photograph request module may detect the photographing scenario.

Alternatively, the terminal device may further include a scenario detection module. The photograph request module may obtain the photographing scenario from the scenario detection module. The scenario detection module may perform photographing scenario detection on the image in the cache queue, to obtain the photographing scenario; or perform photographing scenario detection through a parameter of the image, to obtain the photographing scenario. The parameter of the image includes but not limited to: automatic exposure control AE, automatic focusing control AF, automatic white balancing control AWB information, picture information (for example, an image width or height), an exposure parameter (an aperture size, a shutter speed, and a photosensibility aperture value), and the like.

S704. The photograph request module sends the photograph request to a background photographing module.

In a possible implementation, the photograph request module further sends the photograph request to the feature module. The feature module may invoke the camera driver based on the photograph request to drive the camera to change the photographing manner (for example, the exposure time).

S705. The background photographing module determines a frame selection policy based on the photograph request.

In this embodiment of this application, the frame selection policy includes a quantity of selected images. The quantity may be 1 or may be any other value. This is not limited herein.

In a possible implementation, the background photographing module determines the frame selection policy based on the photographing scenario. The frame selection policy may include an image selection manner.

It may be understood that, the frame selection policy is related to the photographing scenario. Image selection manners in frame selection policies corresponding to different photographing scenarios are different. The image selection manner may be selecting based on a priority sequence of image selection parameters (referred to as frame selection parameters for short), or may be selecting based on weight values of the image selection parameters. The image selection parameters include but not limited to: a definition, a contrast, and a jitter amount.

In a possible implementation one, the image selection parameters respectively include different priorities.

For example, when photographing is performed in an HDR scenario, a priority of the definition is 2, a priority of the contrast is 1, and a priority of the jitter amount is 3. The terminal device selects an image from the cache queue in descending order of the contrasts; when the contrasts of images are the same, the image is selected from the cache queue in descending order of the definitions; and when the contrasts and the definitions of the images are the same, the image is selected from the cache queue in descending order of the jitter amounts.

It should be noted that, the priorities corresponding to the image selection parameters are merely an example. In an actual application, the priorities of the parameters may be set based on an actual situation. For example, the priority of the definition is 1, the priority of the contrast is 2, and the priority of the jitter amount is 3. This is not specifically limited in this embodiment of this application.

In a possible implementation two, the image selection parameters respectively correspond to weight values.

For example, when photographing is performed in an HDR scenario, a first weight corresponding to the definition is 0.4, a second weight corresponding to the contrast is 0.5, and a third weight corresponding to the jitter amount is 0.1. The terminal device selects an image based on the weight values corresponding to the three parameters. In a possible implementation, the terminal device respectively sorts the images in the cache queue based on the three parameters, and each image obtains 3 sorting ranks. A score of each image is calculated based on the 3 sorting ranks and corresponding weight values. The images are selected in descending order of the scores.

It should be noted that, the weight values corresponding to the image selection parameters are merely an example. In an actual application, specific weight values corresponding to the parameters may be set based on an actual situation. For example, the first weight corresponding to the definition is 0.5, the second weight corresponding to the contrast is 0.4, and the third weight corresponding to the jitter amount is 0.1. This is not specifically limited in this embodiment of this application.

In this embodiment of this application, a quantity, the priority sequence, and the weight values of the image selection parameters are not specifically limited.

In this way, the image selection manner is refined, the image is selected based on the photographing scenario, and a processing effect of selecting the image is improved. Therefore, the picture is clearer, details are more apparent, and a photographing effect of the picture is improved.

S706. The background photographing module selects an image from the feature module based on the frame selection policy and the photograph request.

In this embodiment of this application, the selected image is an image stored in the cache queue. The selected image may be an image corresponding to a preview picture when the terminal device receives the photograph operation, or may be an image within a preset duration range of the image, or may be an image cached after the photograph operation. A cache time of the selected image is not specifically limited in this embodiment of this application.

The preset duration may be set based on an actual situation, and the preset duration is generally set to a relatively small value. An example in which the preset duration is one second is used. That is, one or more frames of images corresponding to a preview picture within one second (that is, the preset duration is one second) before the photograph operation of the user are selected.

In a possible implementation, the terminal device may select a plurality of continuous frames of images or may select a plurality of non-continuous frames of images. This is not limited in this embodiment of this application.

S707. The background photographing module increases a quantity of invocation times of the selected image by 1.

In this way, when the terminal device receives an operation used for indicating to exit the camera application and does not complete algorithm processing, the quantity of invocation times of the selected image is not zero, the images in the cache queue are not cleared, and the images may continue to be used in the background photographing module.

It may be understood that, in this embodiment of this application, by increasing the quantity of invocation times of the selected image by 1, the cache queue is controlled to be prevented from deleting the selected image. In this embodiment of this application, the cache queue may be controlled to be prevented from deleting the selected image in another manner. For example, a label used for indicating undeletable is added to the selected image in the cache queue.

S708. The feature module transmits the selected image to a foreground photographing module.

It may be understood that, when the terminal device performs processing on the selected image, one frame of image may be used as a reference frame of image. In a possible implementation, the feature module transmits the reference frame of image to the foreground photographing module.

S709. The foreground photographing module performs thumbnail processing after receiving the selected image, to obtain a thumbnail.

S710. The foreground photographing module transmits the thumbnail to the camera application through the feature module and the camera access interface for display.

S711. The feature module transmits the selected image to the background photographing module.

S712. The background photographing module performs algorithm processing on the selected image.

The algorithm processing includes but not limited to: noise reduction, linear brightening, tone mapping, gamma correction, fusion, and the like.

It may be understood that, the background photographing module may select, through comparison from a plurality of selected frames of images, one frame of image whose image quality (for example, saturation or a definition) is relatively high as the reference frame of image, and perform fusion processing with another selected image based on the reference frame of image.

Alternatively, the background photographing module uses an image corresponding to a preview picture when the photograph operation is received as a reference frame of image, and performs fusion processing with another selected image based on the reference frame of image.

S713. The background photographing module increases the quantity of invocation times of the selected image by 1 after completing the algorithm processing.

In this way, the selected image may be deleted, so that memory occupied by the selected image may be released in time.

In a possible implementation, a quantity of invocation times of each frame of image in the selected image is managed correspondingly. When one frame of image is not used for algorithm processing, a quantity of invocation times of the image is reduced by 1, so that the image may be deleted from the cache queue.

S714. The background photographing module performs format conversion on the image after the algorithm processing, to obtain a picture.

For example, the background photographing module may convert an image from a raw format into a jpg format or a jpeg format; or convert an image from a yuv format into a jpg format or a jpeg format.

S715. The background photographing module transmits the picture to a Gallery application to store the picture.

In this way, the background photographing module may select an image from the cache queue of the feature module, to select a frame flexibly and quickly, and the foreground photographing module does not need to copy the selected image. Therefore, a copy process is reduced, memory occupation is reduced, and power consumption is reduced.

The foregoing describes the photographing method in the embodiments of this application. The following describes a terminal device performing the photographing method provided in the embodiments of this application. It may be understood by a person skilled in the art that the method and the apparatus can be combined with or refer to each other. The terminal device provided in this embodiment of this application can perform the steps of the foregoing photographing method. To implement the foregoing functions, the terminal device includes corresponding hardware structures and/or software modules for performing the functions. A person skilled in the art should be easily aware that the method steps in the examples described with reference to the embodiments disclosed in this specification can be implemented in this application in a form of hardware or a combination of hardware and computer software. Whether a function is performed by hardware or hardware driven by computer software depends on particular application and design constraint conditions of the technical solutions. A person skilled in the art may use different methods to implement the described functions for each particular application, but it should not be considered that the implementation goes beyond the scope of this application.

The photographing method provided in this embodiment of this application may be applied to an electronic device that has a photographing function. The electronic device includes a terminal device, which may also be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like. A specific technology and a specific device form that are used by the terminal device are not limited in the embodiments of this application.

Figure 8:
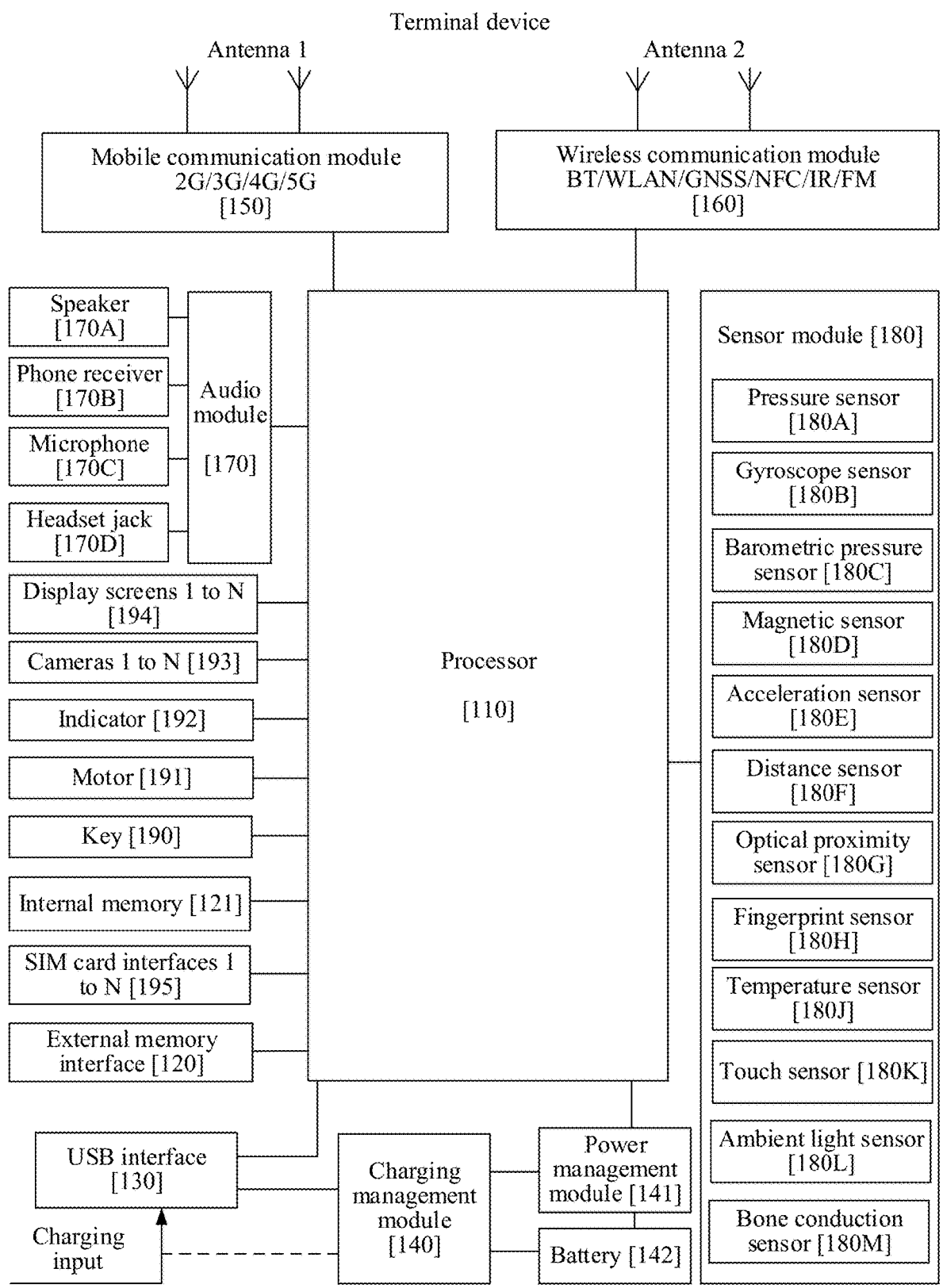
FIG. 8 is a schematic structural diagram of a terminal device according to an embodiment of this application.

For example, FIG. 8 is a schematic structural diagram of a terminal device according to an embodiment of this application.

The terminal device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the terminal device. In some other embodiments of this application, the terminal device may include more or fewer components than those shown in the figure, or some components may be combined, or some components may be split, or a different component arrangement may be used. Components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a timing signal, to control instruction fetching and instruction execution.

The processor 110 may further be configured with a memory configured to store instructions and data. In some embodiments, the memory in the processor 110 is a cache. The memory may store instructions or data that is recently used or cyclically used by the processor 110. If the processor 110 needs to use the instructions or the data again, the processor may directly invoke the instructions or the data from the memory. This avoids repeated access, and reduces a waiting time of the processor 110, and therefore improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

It may be understood that the interface connection relationship between the modules shown in this embodiment of the present invention is merely an example, and does not constitute a limitation on the structure of the terminal device. In some other embodiments of this application, the terminal device may alternatively use an interface connection manner different from that in the foregoing embodiment, or use a combination of a plurality of interface connection manners.

The terminal device implements a display function by using the GPU, the display screen 194, and the application processor. The GPU is a microprocessor for image processing and is connected to the display screen 194 and the application processor. The GPU is configured to perform mathematical and geometric calculation for graphics rendering. The processor 110 may include one or more GPUs, and the GPU executes program instructions to generate or change display information.

The display screen 194 is configured to display an image, a video, and the like. The display screen 194 includes a display panel. The display panel may use a liquid crystal display screen (liquid crystal display, LCD), an organic light-emitting diode (organic light-emitting diode, OLED), an active matrix organic light-emitting diode or an active matrix organic light-emitting diode (active-matrix organic light emitting diode, AMOLED), a flexible light-emitting diode (flex light-emitting diode, FLED), a Miniled, a MicroLed, a Micro-oLed, a quantum dot light-emitting diode (quantum dot light emitting diodes, QLED), or the like. In some embodiments, the terminal device may include one or N display screens 194, where N is a positive integer greater than 1.

The terminal device may implement a photographing function by using an ISP, the camera 193, a video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into an image visible to naked eyes. The ISP may also perform algorithm optimization on noise point, brightness, and skin tone of an image. The ISP may further optimize parameters such as an exposure and a color temperature of a to-be-photographed scenario. In some embodiments, the ISP may be disposed in the camera 193.

The camera 193 is configured to capture a static image or video. An object generates an optical image by using a lens and projects the optical image onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device may include one or N cameras 193, where N is a positive integer greater than 1. Types of the plurality of cameras 193 may be different. For example, the camera 193 may include a camera or a TOF camera configured to obtain a color image.

The digital signal processor is configured to process a digital signal and may process another digital signal in addition to the digital image signal. For example, when the terminal device selects a frequency, the digital signal processor is configured to perform Fourier transform and the like on energy of the frequency.

The video codec is configured to compress or decompress a digital video. The terminal device may support one or more types of video codecs. In this way, the terminal device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor that quickly processes input information by referring to a structure of a biological neural network, for example, by referring to a transmission mode between human brain neurons, and can further perform self-learning continuously. Applications such as intelligent cognition of the terminal device, such as image recognition, facial recognition, speech recognition, and text understanding, may be implemented by using the NPU.

The external memory interface 120 may be configured to connect to an external memory card such as a Micro SD card, to expand a storage capacity of the terminal device. The external storage card communicates with the processor 110 through the external memory interface 120, to implement a data storage function, for example, store files such as music and a video into the external memory card.

The internal memory 121 may be configured to store computer-executable program code, and the executable program code includes instructions. The internal memory 121 may include a program storage region and a data storage region. The program storage region may store an operating system, an application program required by at least one function (such as a voice playing function or an image playing function), and the like. The data storage region may store data (such as audio data and an address book) created during use of the terminal device, and the like. In addition, the internal memory 121 may include a high-speed random access memory, and may further include a non-volatile memory, for example, at least one magnetic disk storage device, a flash memory device, or a universal flash storage (universal flash storage, UFS). The processor 110 executes the functional applications and data processing of the terminal device by executing instructions stored in the internal memory 121 and/or instructions stored in a memory disposed in the processor.

A software system of the terminal device may use a layered architecture, an event driven architecture, a microkernel architecture, a microservice architecture, or a cloud architecture. For a software structure of the terminal device, reference may be made to FIG. 6. Details are not described herein again.

An embodiment of this application provides a terminal device, and the terminal device includes a processor and a memory. The memory stores computer-executable instructions; and the processor executes the computer-executable instructions stored in the memory, to cause the terminal device to perform the foregoing method.

An embodiment of this application provides a chip, and the chip includes a processor and a memory. The memory stores computer-executable instructions; and the processor executes the computer-executable instructions stored in the memory, to cause the terminal device to perform the foregoing method.

An embodiment of this application further provides a computer-readable storage medium. The computer-readable storage medium stores a computer program. When the computer program is executed by a processor, the foregoing method is implemented. All or some of the methods described in the foregoing embodiments may be implemented by software, hardware, firmware, or any combination thereof. If implemented in software, the functions may be stored on or transmitted over a computer-readable medium as one or more instructions or code. The computer-readable medium may include a computer storage medium and a communication medium, and may further include any medium that can transfer a computer program from one place to another. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is used to carry or store required program code in a form of instructions or a data structure and that can be accessed by a computer. In addition, any connection is appropriately referred to as a computer-readable medium. For example, if software is transmitted from a website, a server, or another remote source by using a coaxial cable, an optical fiber cable, a twisted pair, a digital subscriber line (Digital Subscriber Line, DSL) or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc, a laser disc, an optical disc, a digital versatile disc (Digital Versatile Disc, DVD), a floppy disk, and a blue ray disc, where the magnetic disk generally reproduces data in a magnetic manner, and the optical disc reproduces data optically by using laser. The foregoing combinations also need to be included within the scope of the computer-readable medium.

An embodiment of this application provides a computer program product. The computer program product includes a computer program, and when the computer program is run, a computer is caused to perform the foregoing method. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner.

The embodiments of this application are described with reference to the flowcharts and/or block diagrams of a method, a device (system), and a computer program product of the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided to a general-purpose computer, a dedicated computer, an embedded processor, or a processing unit of another programmable device to generate a machine, so that the instructions executed by a computer or a processing unit of another programmable data processing device generate an apparatus for implementing a specific function in one or more processes in the flowcharts and/or in one or more blocks in the block diagrams.

The foregoing specific implementations further describe in detail the objectives, technical solutions, and beneficial effects of the present invention. It should be understood that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A photographing method, comprising:
caching, by a terminal device when displaying a photographing preview interface, a plurality of frames of preview images in a cache queue;
receiving, by the terminal device, a photograph operation in the photographing preview interface;
selecting, by the terminal device, an image from the cache queue in response to the photograph operation;
controlling, by the terminal device, the selected image to be in an undeletable state in the cache queue;
deleting, by the terminal device, the selected image in the cache queue when the terminal device completes algorithm processing based on the selected image; and
generating, by the terminal device, a picture based on the image on which the algorithm processing is performed.

2. The method according to claim 1, wherein the controlling, by the terminal device, the selected image to be in an undeletable state in the cache queue comprises: adding, by the terminal device, a label to the selected image, wherein the label is used for indicating undeletable.

3. The method according to claim 2, wherein the adding, by the terminal device, a label to the selected image comprises: increasing, by a background photographing module in the terminal device, a quantity of invocation times of the selected image by 1.

4. The method according to claim 1, wherein the selecting, by the terminal device, an image from the cache queue in response to the photograph operation comprises:
selecting, by a background photographing module in the terminal device after the terminal device receives the photograph operation, a first frame selection policy from a plurality of pre-stored frame selection policies, wherein the first frame selection policy is used for indicating an image selection manner of the background photographing module, and the first frame selection policy is related to a photographing scenario; and selecting, by the background photographing module, the image from the cache queue based on the first frame selection policy.

5. The method according to claim 4, wherein the first frame selection policy comprises one or more frame selection parameters, and each frame selection parameter comprises but not limited to: a definition, a contrast, a jitter amount, or an exposure time.

6. The method according to claim 5, wherein priority sequences of at least one frame selection parameter in any two frame selection policies are different; or
weight values corresponding to at least one frame selection parameter in any two frame selection policies are different.

7. The method according to claim 1, wherein the selecting, by the terminal device, an image from the cache queue in response to the photograph operation comprises:
selecting, by the terminal device after receiving the photograph operation, a first photograph request from a plurality of pre-stored photograph requests, wherein the first photograph request is used for indicating a quantity of images selected by the terminal device, and the first photograph request is related to a photographing scenario; and
selecting, by the terminal device, the image from the cache queue based on the first photograph request.

8. The method according to claim 7, wherein when the photographing scenario is a high dynamic range imaging scenario, the first photograph request is further used for indicating the terminal device to adjust an exposure time.

9. The method according to claim 1, wherein the selected image is a plurality of continuous frames of images in the cache queue, or the selected image is a plurality of non-continuous frames of images in the cache queue.

10. The method according to claim 1, wherein the generating, by the terminal device, a picture based on the image on which the algorithm processing is performed comprises:
performing, by a background photographing module in the terminal device, format conversion on the image on which the algorithm processing is performed, to generate the picture.

11. The method according to claim 1, wherein
the algorithm processing comprises but not limited to: noise reduction, linear brightening, tone mapping, gamma correction, or fusion.

12. The method according to claim 1, wherein the method further comprises:
transmitting, by the cache queue, the selected image to a foreground photographing module in the terminal device; and
forming, by the foreground photographing module, a thumbnail based on the selected image, wherein the thumbnail is displayed in the photographing preview interface of the terminal device after the photograph operation.

13. A terminal device, comprising:
a processor and a memory, wherein the memory stores computer-executable instructions; and
the processor executes the computer-executable instructions stored in the memory, to cause the terminal device to perform a photographing method, the method comprising:
caching, when displaying a photographing preview interface, a plurality of frames of preview images in a cache queue;
receiving a photograph operation in the photographing preview interface;
selecting an image from the cache queue in response to the photograph operation;
controlling the selected image to be in an undeletable state in the cache queue;
deleting the selected image in the cache queue when the terminal device completes algorithm processing based on the selected image; and
generating a picture based on the image on which the algorithm processing is performed.

14. The terminal device according to claim 13, wherein controlling the selected image to be in an undeletable state in the cache queue comprises:
adding a label to the selected image, wherein the label is used for indicating undeletable.

15. The terminal device according to claim 14, wherein adding a label to the selected image comprises:
increasing a quantity of invocation times of the selected image by 1.

16. The terminal device according to claim 13, wherein selecting an image from the cache queue in response to the photograph operation comprises:
selecting, after the terminal device receives the photograph operation, a first frame selection policy from a plurality of pre-stored frame selection policies, wherein the first frame selection policy is used for indicating an image selection manner, and the first frame selection policy is related to a photographing scenario; and
selecting the image from the cache queue based on the first frame selection policy.

17. A non-transitory computer-readable storage medium, storing a computer program, wherein when the computer program is executed by a processor, causes the processor to perform a photographing method, the method comprising:
caching, when displaying a photographing preview interface, a plurality of frames of preview images in a cache queue;
receiving a photograph operation in the photographing preview interface;
selecting an image from the cache queue in response to the photograph operation;
controlling the selected image to be in an undeletable state in the cache queue;
deleting the selected image in the cache queue when algorithm processing is completed based on the selected image; and
generating a picture based on the image on which the algorithm processing is performed.

18. The computer-readable storage medium according to claim 17, wherein controlling the selected image to be in an undeletable state in the cache queue comprises:
adding a label to the selected image, wherein the label is used for indicating undeletable.

19. The computer-readable storage medium according to claim 18, wherein adding a label to the selected image comprises:
increasing a quantity of invocation times of the selected image by 1.

20. The computer-readable storage medium according to claim 17, wherein selecting an image from the cache queue in response to the photograph operation comprises:
    selecting, after receiving the photograph operation, a first frame selection policy from a plurality of pre-stored frame selection policies, wherein the first frame selection policy is used for indicating an image selection manner, and the first frame selection policy is related to a photographing scenario; and
    selecting the image from the cache queue based on the first frame selection policy.

\* \* \* \* \*